(No Model.)
H. LA CASSE.
ANTIFRICTION BALL BEARING.
No. 518,321. Patented Apr. 17, 1894.
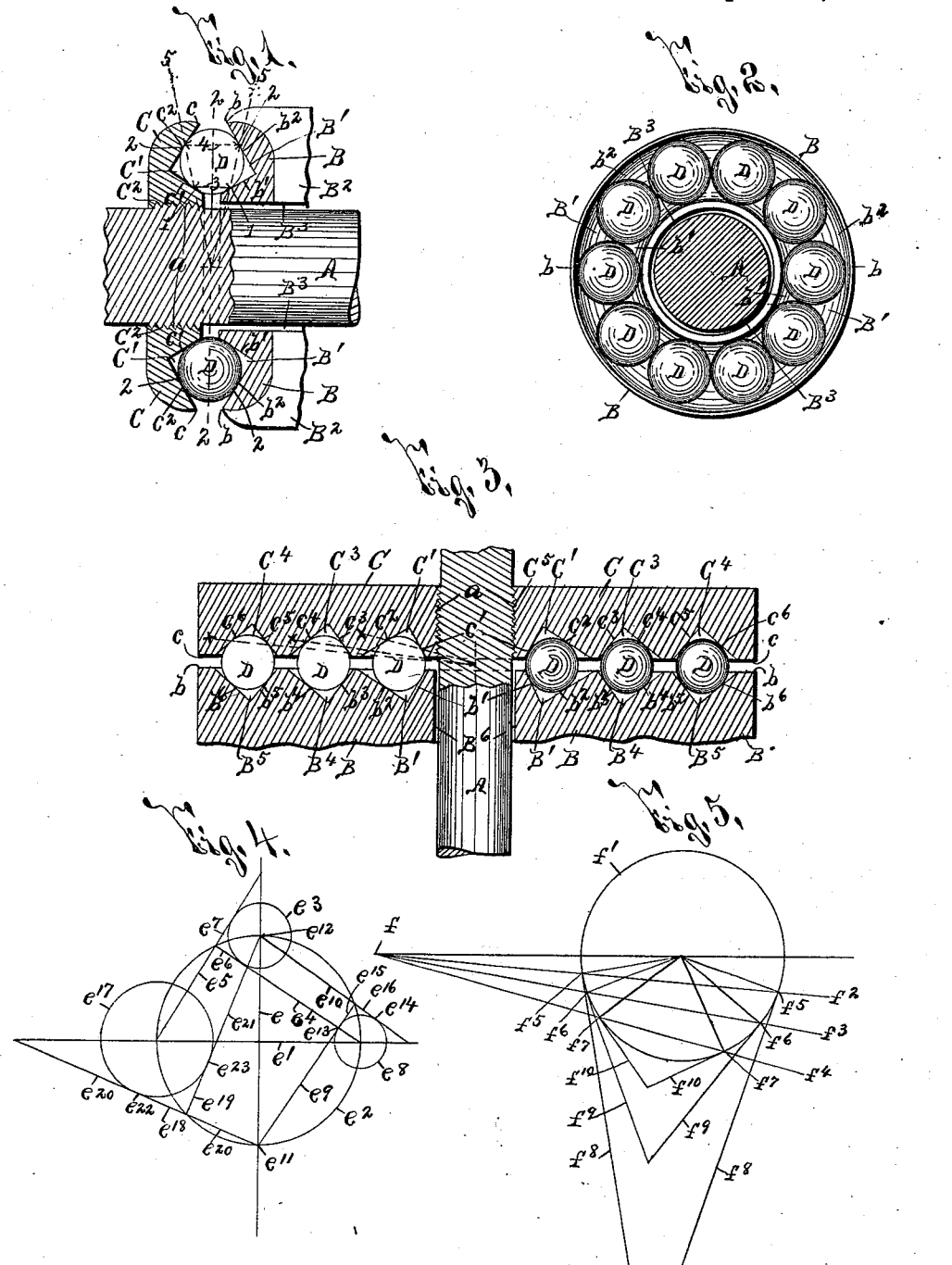
WITNESSES:
INVENTOR
Henry La Casse
BY
ATTORNEYS.

UNITED STATES PATENT OFFICE.

HENRY LA CASSE, OF ROCHESTER, NEW YORK.

ANTIFRICTION BALL-BEARING.

SPECIFICATION forming part of Letters Patent No. 518,321, dated April 17, 1894.

Application filed October 17, 1892. Serial No. 449,143. (No model.)

*To all whom it may concern:*

Be it known that I, HENRY LA CASSE, of Rochester, in the county of Monroe, in the State of New York, have invented new and useful Improvements in Antifriction Ball-Bearings, of which the following, taken in connection with the accompanying drawings, is a full, clear, and exact description.

My invention relates to improvements in ball bearings, and has for its object the production of a simple and practical construction, which is highly efficient and durable in use; and to this end it consists, essentially, in anti friction balls, opposite bearing sections for said balls, one of which is provided with inner and outer bearing surfaces of such relative arrangement and construction that the anti friction balls revolve freely between said surfaces without sliding movement and consequent wear and friction.

The invention furthermore consists in the detail construction and arrangement of parts, all as hereinafter more particularly described and pointed out in the claims.

In describing this invention, reference is had to the accompanying drawings, forming a part of this specification, in which, like letters indicate corresponding parts in all the views.

Figure 1 is a vertical sectional view of a horizontal shaft and my improved ball bearing operatively provided thereon; one of the anti friction balls being unshaded for the purpose of clearly indicating the points of contact of the inner and outer bearing surfaces of the bearing sections and the adjacent portions of the surfaces of the balls in contact therewith. Fig. 2 is a transverse sectional view, taken on line —2—2—, Fig. 1. Fig. 3 is a vertical sectional view of a vertical shaft and a slightly modified form of my improved bearing, the anti friction balls at the left-hand of the same being unshaded for the same purpose as at Fig. 1, and Figs. 4 and 5 are diagrammatic views, representing the method of determining upon the transverse angles of the opposite circular bearing surfaces of the bearing grooves within which the anti friction balls revolve.

It is well known that the friction of revolving shafts, axles, &c., has heretofore been greatly reduced by means of ball bearings, which form a support or journal for said shafts. It is equally well known, however, that these bearings must be continually lubricated, and that the balls soon become flattened, and the bearing surfaces of the bearing sections considerably worn, especially if the slightest dirt or grit is permitted to enter the grooves in which the anti friction balls revolve. This undue wear of said antifriction balls and bearing surfaces is due to the fact that the bearing portions of the ball surfaces nearest at any one time to the center around which said balls revolve, rest against a bearing surface of the bearing section of less circumference than the opposite surface of said section against which rest the bearing portions of the ball surfaces most remote from said center, and that consequently the balls have considerable sliding movement, especially when there is considerable difference between the size of said circumferences of the inner and outer bearing surfaces of the grooves for the anti friction balls.

My present invention is of such construction and arrangement that the balls revolve freely between the bearing surfaces of the bearing sections without any sliding movement, and consequently the wear of the parts is reduced to a minimum, their life greatly lengthened, and the bearing rendered highly efficient and practical.

—A—, Fig. 1, represents a shaft, and —B— C— bearing sections for said shaft arranged with their adjacent faces —b—c— slightly separated from each other.

—D— represents anti friction balls interposed between the bearing sections —B—C—, and adapted to roll in circular grooves —B' —C'— formed in the adjacent faces —b—c—. The section —B— is preferably held stationary upon any suitable supporting bracket or frame —B²—, not necessary to herein further illustrate or describe, and is formed with a journal opening —B³— of greater diameter than the portion of the shaft —A— within said opening. The section —C— is formed with a screw-threaded opening —C²— adapted to engage a screw-threaded portion —a— upon the shaft —A— for adjusting the section —C— toward and away from the section —B— in order to operatively clamp the balls —D— in position. The grooves —B'—C'— are formed angular in cross section, and are composed of opposite circular transversely inclined faces provided with inner and outer bearing surfaces $-b'-c'-b^2-c^2-$, which bear against the adjacent portions $-1-1-$, $-2-2-$ of the surfaces of the balls $-D-$. These bearing surfaces $-b'-c'-b^2-c^2-$ are so relatively arranged and constructed that the portions thereof in contact with the balls $-D-$ are disposed tangentially to the portions of the adjacent surfaces of the balls in contact therewith. These bearing surfaces are also so constructed and arranged that inclined lines $-5-5-$, Fig. 1, drawn respectively from the center around which the balls are revolved to the points of contact of the faces $-b'-c'-$ and the portions $-2-2-$ of the surface of the ball $-D-$ pass respectively through the points of contact of the faces $-b^2-c^2-$ and the portions $-1-1-$ of the surface of the ball $-D-$.

Although the bearing surfaces $-b'-c'-b^2-c^2-$ of the bearing sections $-B-C-$ engage at any one time only very small portions or points of the bearing surfaces of the balls $-D-$, as seen at Fig. 1, yet it will be readily understood that, as the shaft $-A-$ and the balls $-D-$ revolve without sliding movement around their axes which are coincident with the plane of the section line 2—2, the bearing surfaces $-b'-c'-$ engage a circular portion $-1-1-$ of the inner face of each of the balls, the diameter of which is of the same length as the line $-3-$, Fig. 1, and that the surfaces $-b^2-c^2-$ engage a circular portion $-2-2-$ of the outer face of each of the balls $-D-$ having a diameter of the same length as the line $-4-$, which, it will be noted, is considerably longer than the line $-3-$. The diameter of that part of the surfaces $-b'-c'-$ of the grooves $B'$ $C'$ which bear against the portions $-1-1-$ of the surfaces of the balls $-D-$ is considerably less than the diameter of that part of the surfaces $-b^2-c^2-$ of said grooves $B'$ $C'$ which bear against the portions $-2-2-$ of the surface of the balls $-D-$, and, when these surfaces $-b'-c'-b^2-c^2-$ are constructed, as described, the circumferences of said surfaces bear the same proportion to each other as the circumferences of the portions $-1-1-$, $-2-2-$ or the surfaces of the balls $-D-$ engaged thereby. Consequently it requires just as many revolutions of the bearing portions $-1-1-$ of the surfaces of the balls $-D-$ to travel once around the surfaces $-b'-c'-$ engaging the same as it requires of the bearing portions $-2-2-$ of the surface of the balls $-D-$ to travel once around the surfaces $-b^2-c^2-$ engaged therewith. The balls $-D-$, therefore, traverse the grooves $-B'-C'-$ freely without any sliding movement, in the same manner as a cone having its outer end of a diameter equal to the line $-4-$ and its inner end of a diameter equal to the line $-3-$ would traverse said grooves.

As described lines $-5-5-$, Fig. 1 drawn from the points of contact of the outer surfaces $-b^2-c^2-$ of the bearing section grooves $-B'-C'-$ to the corresponding points of contact of the bearing surfaces $-b'-c'-$ converge at the center of the shaft $-A-$. It is evident, however, that if these surfaces were so constructed that lines, so drawn, would converge at one side of said center, the balls would revolve with much less friction and wear upon the parts than if said lines were disposed in parallel planes as is the case with ball bearings as heretofore constructed.

It is evident from the foregoing that a shaft revolves in a ball bearing of this construction with the least possible friction, and that the anti friction balls revolve freely within the grooves for receiving the same without liability of sliding movement of said balls and undue wear upon the parts.

I have discovered by the practical use of my improved bearing that the anti friction balls revolve so freely between their bearing surfaces, even when the shaft supported or journaled by the balls is revolved at high speed and required to withstand great strain, that it is not necessary to lubricate the bearing to prevent wear. This efficient action is greatly aided by separating the adjacent faces $-b-$ and $-c-$ of the bearing sections $-B-C-$, since all dust, grit, &c., escape from the grooves $-B'-C'-$ and from between said faces without unduly wearing or grinding the surfaces of the balls or of said grooves.

It is evident that my improved bearing may be of various constructions, and at Fig. 1 it is shown as applied to a horizontal shaft. At Fig. 3, however, I have shown the bearing sections $-B-C-$ as arranged horizontally, and as having their inner faces $-b-c-$ formed with a series of grooves $-B'-B^4-B^5-$, $-C'-C^3-$ and $-C^4-$ having their bearing surfaces $-b'-b^2-b^3-b^4-b^5-b^6-$, $-c'-c^2-c^3-c^4-c^5-c^6-$ constructed in the same manner as the bearing faces $-b'-b^2-c'-c^2-$ of the bearing sections $-B-C-$, shown at Fig. 1. The opposite bearing surfaces of the opposite faces of the grooves $-B'-B^4-B^5-$, $-C'-C^3-C^4-$, are so arranged that inclined lines as the lines $x$ drawn from the point of contact of the outer bearing surface of any one of these grooves, to the center around which said balls revolve, cross the corresponding points of contact of the inner bearing surface of said groove, and consequently it will be readily understood that the transverse angles of the corresponding bearing surface vary considerably, but that the transverse angles of the opposite faces of each groove are arranged at a right angle with each other. It will also be understood, however, that the outer and inner bearing surfaces of these grooves are arranged in planes at dissimilar angles with the axes of the balls bearing against said faces or sides, and that the inner surfaces of the grooves are nearer the axes of the balls than the outer bearing surfaces thereof. The bearing section $-B-$ is formed with an aperture —B³— Fig. 1 of greater diameter than the portion of the shaft —A— within the same, and the bearing section —C— is provided with a screw-threaded socket —C²— Fig. 1 for engaging a screw-threaded portion —a— upon the shaft —A—.

At Fig. 4 I have shown a diagrammatic view illustrating the method of ascertaining the transverse angle of the bearing surfaces of the bearing sections shown at Figs. 1 and 2. In this figure lines —e—e'— are arranged so as to cross each other at right angles, and a circle —e²— is circumscribed around the point of intersection of said lines. The diameter of this circle is equal to the distance between the centers of any two diametrically opposite balls —D—D— illustrated at Figs. 1 and 2. —e³— is a circle of the same diameter as one of the balls —D—, which is circumscribed around the point of intersection of the upper end of the line —e— and the circle —e²—. A line —e⁴— is then drawn from the point of intersection of the right-hand end of the line —e'— and the circle —e²— tangent to the inner face of the circle —e³—. A similar line —e⁵— is then drawn from the point of intersection of the opposite end of the line —e'—, and the circle —e²— tangent to the outer face of the circle —e³—. The portions —e⁶—e⁷— of the lines —e⁴—e⁵— represent the respective transverse angles of the surfaces —b'—c'— and —b²—c²— of the grooves —B'—C'—. I have also shown on this figure a circle —e⁸— of the same diameter as the balls —D— shown at Fig. 3, and lines —e⁹—e¹⁰— drawn in the same manner as the lines —e⁴—e⁵— from the points of intersection —e¹¹—e¹²— of the circle —e²—, tangent to the points —e¹³—e¹⁴— of the circle —e⁸—. The portions —e¹⁵—e¹⁶— of the lines —e⁹—e¹⁰— represent the transverse angles of the bearing surfaces of grooves of the same diameter as the ring —e²— adapted to receive anti friction balls of the same diameter as those shown at Fig. 3. I have also shown at this figure a larger circle —e¹⁷— representing a bearing ball of considerable diameter, and by means of the outer portions —e¹⁸—e¹⁹— of lines —e²⁰—e²¹— drawn from the points —e¹²—e¹¹— tangent to the points —e²²—e²³— of the circle —e¹⁷—, I have shown the desired transverse angles of the sides of a groove of the same diameter as the grooves —B'—C'— when designed for receiving anti friction balls of the same diameter as the circle —e¹⁷—.

It will be readily understood upon reference to Figs. 1 and 3 that corresponding transverse sections of the opposite bearing surfaces of each of the bearing grooves, shown at said figures, are arranged at a right angle with each other, and that they are necessarily so constructed when their angles are determined in the manner indicated at Fig. 4. It is frequently advisable, however, to vary the points of contact of the bearing surfaces of the grooves for receiving the anti friction balls, so that corresponding transverse sections of these surfaces, when properly constructed, are arranged at angles greater or less than a right angle. Accordingly at Fig. 5 I have shown a diagrammatic view, in which the point —f— represents the center around which the anti friction balls are to be revolved, and —f'— a circle of the same diameter as one of these balls. The converging lines —f²—f³—f⁴— extend from the point —f— and cross the circle —f'— at points —f⁵—f⁵—f⁶—f⁶— and —f⁷—f⁷—.

In order to determine the desired angle of the bearing surfaces for engaging balls of the same diameter as the circle —f'— at said points of intersection of said circle I construct lines —f⁸—f⁸—, —f⁹—f⁹, —f¹⁰—f¹⁰—, which are respectively tangent to the points —f⁵—f⁵—, —f⁶—f⁶—, —f⁷—f⁷—. It will thus be readily understood that, providing the diameter of the anti friction balls and the diameter of the circle, around which the centers of said balls revolve, is known, the transverse angles of the bearing surfaces of the grooves for said balls may be readily ascertained, and that the amount of projection of the balls within said grooves may be regulated at will by defining the points of contact of the sides of the grooves with the adjacent bearing portions of the surfaces of the balls.

It is evident that, instead of forming the entire side of the grooves for receiving the anti friction balls, of the required transverse angle, the portions of said sides adapted to contact with the balls may be so constructed and arranged, and the remaining portions of said grooves may be curved or inclined at any desired inclination with the axes of the balls.

The operation of my invention will be readily perceived from the foregoing description and upon reference to the drawings, and it will be particularly noted that the same is simple in construction and arrangement, and that the balls of my improved bearing revolve freely in the grooves or between the bearing faces therefor without any sliding movement, and wear and heating incidental to said sliding movement. It is evident, however, that the construction and arrangement of the parts of my improved bearing may be somewhat varied without departing from the spirit of my invention.

Having thus fully described my invention, what I claim as new, and desire to secure by Letters Patent, is—

1. The combination of the shaft A, the grooved section C fast on said shaft, the stationary grooved section B, the balls D interposed between the sections and located in the grooves thereof, the points at which each ball contacts with the faces of the grooves in the sections lying in the face of an imaginary cone whose vertex is at the center of the shaft, said points of contact being arranged symmetrically with relation to the axis of the cone, and all of the points of contact on one side of said axis being in the section fast on the shaft and all of the points of contact on the opposite side of said axis being in the stationary section, substantially as set forth.

2. The combination of the shaft A, the grooved section C, fast on said shaft, the stationary grooved section B, one of said sections being adjustable toward the other, the balls D interposed between the sections and located in the grooves thereof, the points at which each ball contacts with the faces of the grooves in the sections lying in the face of an imaginary cone whose vertex is at the center of the shaft, said points of contact being arranged symmetrically with relation to the axis of the cone, and all of the points of contact on one side of said axis being in the section fast on the shaft and all of the points of contact on the opposite side of said axis being in the stationary section, substantially as described.

3. The combination of the shaft A, the grooved section C fast and adjustable lengthwise on said shaft, the stationary grooved section B, the balls D interposed between the sections and located in the grooves thereof, the points at which each ball contacts with the faces of the grooves in the sections lying in the face of an imaginary cone whose vertex is at the center of the shaft, said points of contact being arranged symmetrically with relation to the axis of the cone, and all of the points of contact on one side of said axis being in the section fast on the shaft and all of the points of contact on the opposite side of said axis being in the stationary section, substantially as specified.

4. The combination of the shaft A, the grooved section C fast on said shaft, the stationary grooved section $B^2$ having its face separated from the adjacent face of the section C, the balls D interposed between the sections and located in the grooves thereof, the points at which each ball contacts with the faces of the grooves in the sections lying in the face of an imaginary cone whose vertex is at the center of the shaft, said points of contact being arranged symmetrically with relation to the axis of the cone, and all of the points of contact on one side of said axis being in the section fast on the shaft and all of the points of contact on the opposite side of said axis being in the stationary section, substantially as and for the purpose set forth.

In testimony whereof I have hereunto signed my name, in the presence of two attesting witnesses, at Rochester, in the county of Monroe, in the State of New York, this 5th day of October, 1892.

HENRY LA CASSE.

Witnesses:
   HEMPDEN HYDE,
   ETTA WEISBURG.